March 31, 1931.  F. W. SCHROEDER  1,798,635
CONVERTIBLE VEHICLE ATTACHMENTS
Filed Aug. 20, 1928   3 Sheets-Sheet 1

INVENTOR
Frank W. Schroeder

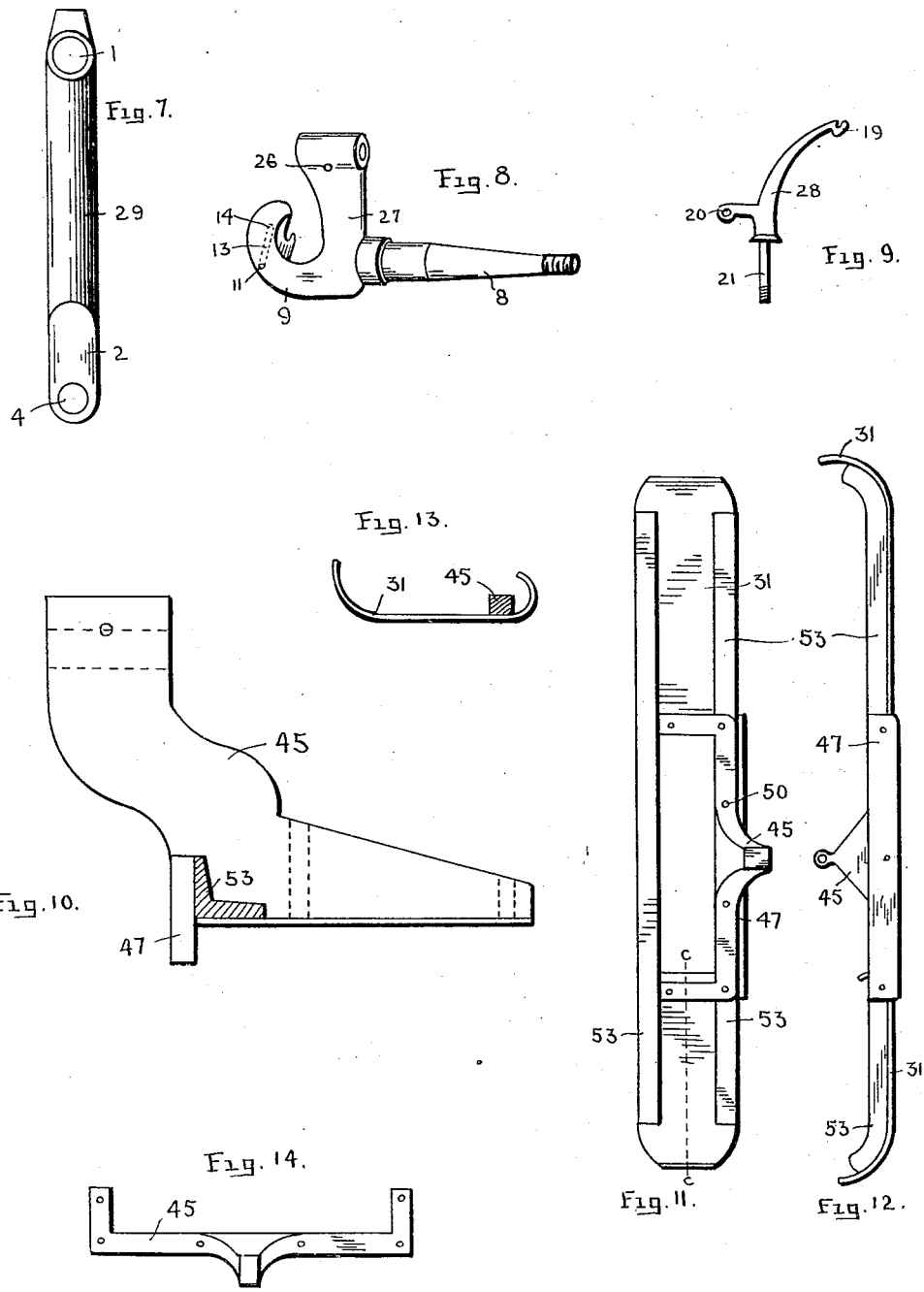

March 31, 1931. F. W. SCHROEDER 1,798,635
CONVERTIBLE VEHICLE ATTACHMENTS
Filed Aug. 20, 1928 3 Sheets-Sheet 3

INVENTOR
Frank W. Schroeder

Patented Mar. 31, 1931

1,798,635

UNITED STATES PATENT OFFICE

FRANK W. SCHROEDER, OF BEMIDJI, MINNESOTA

CONVERTIBLE VEHICLE ATTACHMENT

Application filed August 20, 1928. Serial No. 300,836.

This invention relates to improvements in convertible vehicle attachments of the type including wheels and runners and is particularly designed for use on automobiles or other motor vehicles.

The object of my invention is to provide convertible means whereby either wheels or runners may be quickly and easily brought into operation with a minimum expenditure of time and labor, and without stopping the vehicle. A further object is to provide means for raising the wheels from contact with the road surface where it is covered with snow and using runners alone, and means whereby the wheels may be lowered into operable position and the runners thrown out of use upon patches of dirt road. Means are also provided whereby these changes may be made from the driver's seat by the mere shifting of a lever.

A further object is to provide means for locking together the wheel spindle body and the runner spindle body in such a manner as to be controlled by the same steering apparatus, regardless of the position into which the wheels and runners have been steered. A still further object is to provide a novel means of elevating and carrying the front wheels out of contact with the snow road and so lessening the resistance and consumption of gas.

Other novel features of construction and combination will be pointed out in the appended claims.

Figure 1:
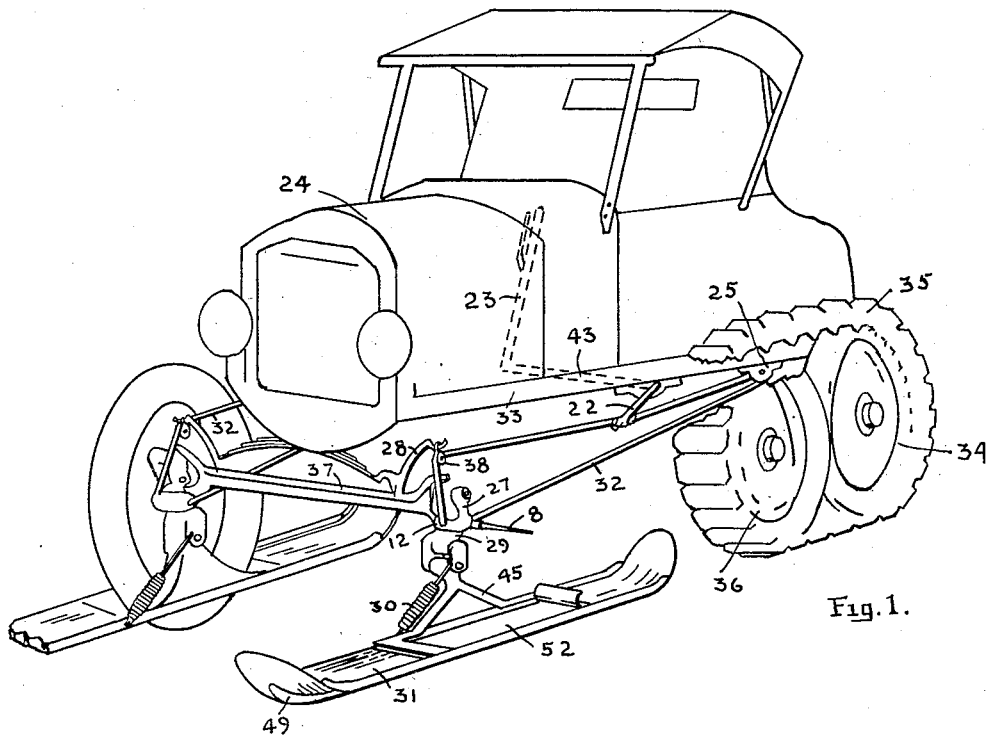
Figures 2, 3, 4, 5, 6:
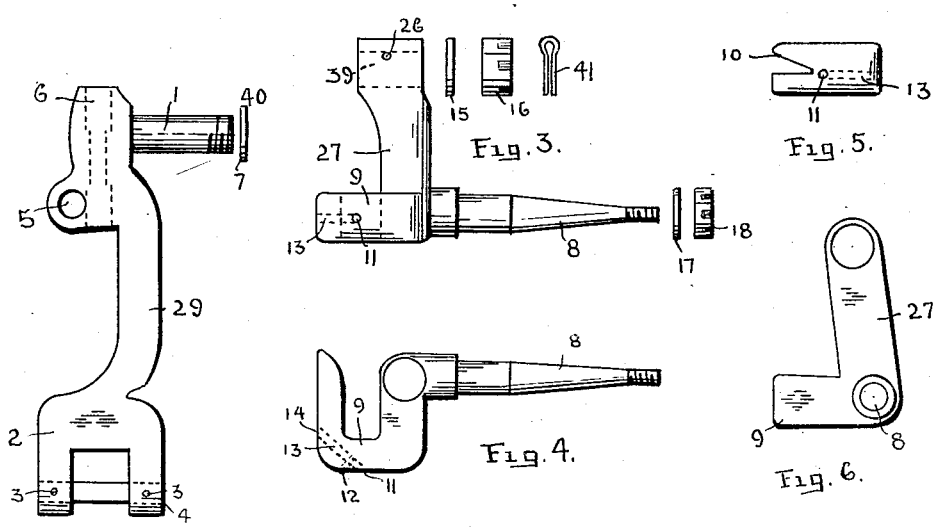
Figure 16:
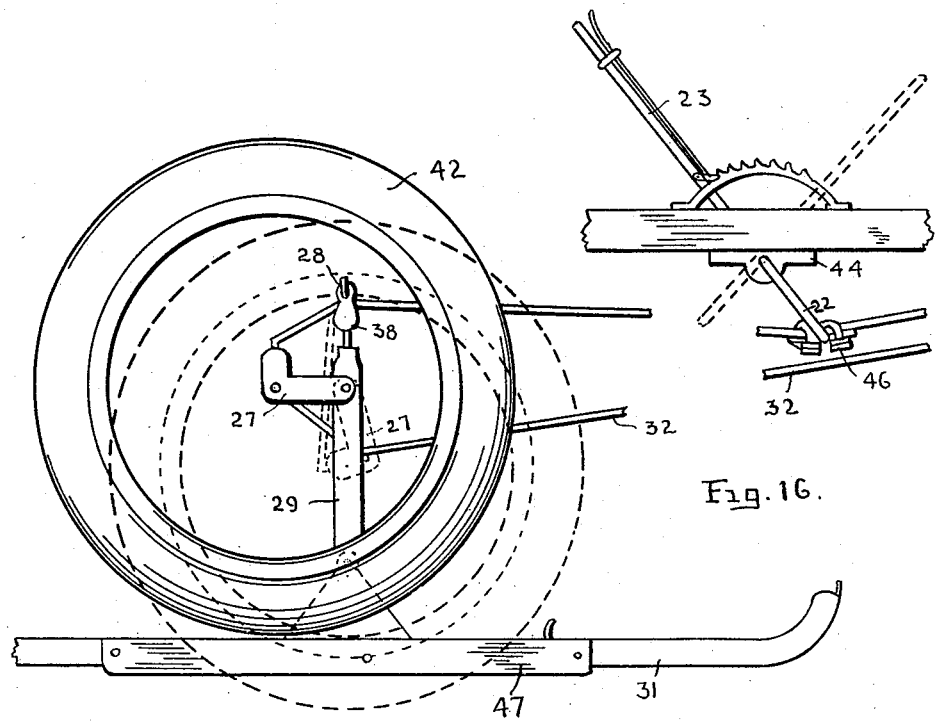
Figure 15:
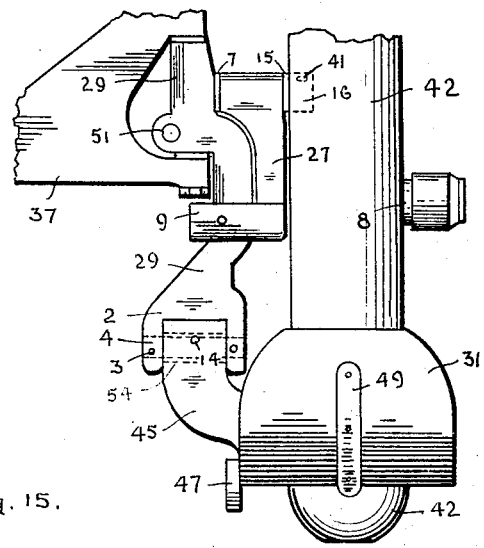

Figure 1 is a fragmentary view in perspective, showing one embodiment of my invention, Fig. 2 is a view in front elevation of a runner spindle body, showing a shaft support for the wheel spindle body of Fig. 3, Fig. 3 is a view in front elevation of a wheel spindle body, Fig. 4 is a top view of a wheel spindle body, Fig. 5 is a side elevation of the hooked portion of the wheel spindle body, Fig. 6 is a side elevation of the wheel spindle body, Fig. 7 is a side elevation of a runner spindle body, Fig. 8 is a perspective view of the operating wheel spindle body, Fig. 9 is a front elevation of the spring and pulley support, Fig. 10 is a front elevation of a runner bracket, Fig. 11 is a top view of the runner, Fig. 12 is a side elevation of a runner, Fig. 13 is a longitudinal section of the rear part of a runner, taken on the line C—C of Fig. 11, Fig. 14 is a top view of a runner bracket, Fig. 15 is a front view of a runner spindle body, runner, bracket arm, and wheel spindle body assembly, showing their relation to each other, and Fig. 16 is a fragmentary view in side elevation showing a wheel in two positions, and details of the cable and the control lever.

In the drawings motor vehicle 24 may be any standard type with a frame 33. Upon a set of drive wheels 34 and a set of idler wheels 36 are carried metal belts 35. The runner spindle bodies 29 are pivotally mounted upon the ends of axle 37. The runner spindle bodies 29 are provided with fixed shafts 1 and washers 7 which slip upon them and act as spacers. Dotted lines 4 designate a pin for pivotally connecting the runner assembly shown in Fig. 11 to the runner spindle body 29 provided with a fork 2. The hole is adapted to receive the steering arm of the vehicle. Dotted lines 6 indicate the position of the spindle bolt and bushings. The wheel spindle body 27, provided with a suitable hole 39 and having a grease inlet 26, is slipped on shaft 1. A spacing washer 15 is next placed on shaft 1 and secured by nut 16, which in turn is secured by cotter key 41, fitting in the slots of nut 16 and passing through hole 40 in shaft 1.

The wheel spindle body 27 thus mounted upon shaft 1 is designed to shift circumferentially and causes spindle 8 to raise or lower the wheel 42 mounted thereon. The wheel spindle body 27 has a hook 9 which fits round the shank of runner spindle body 29 and is designed to give added strength to wheel spindle body 27 when the wheels are used instead of runners. This hook 9 is provided with a hole 13 having an entrance 14 and an outlet 11 for cable 32. The V-shaped opening 10 is designed to give free play to cable 32. An anti-creep washer 17 and a nut 18 fit on shaft 8 of the wheel spindle body 27.

In order to provide for the shifting of wheel spindle body 27 into either high or low position a hand lever 23 is provided. Welded, or otherwise suitably secured to shaft 43 at both ends are arms 22 at right angles to the shaft and of suitable length properly to operate wheel spindle body 27. The shaft 43 is carried in a box 44, which in turn is securely bolted to the frame member 33 of the motor vehicle. The bracket 28 is securely bolted to the front axle 37 by its supporting shaft 21. Hook 19 supports pulley 38 and arm 20 receives a shackle for supporting the spring of the motor vehicle.

A flexible metal cable 32, of proper strength, is threaded through a hole at the end of arm 22, thence forward through pulley 38, thence down through hole 13 where it is secured from slipping by a set screw 12 in hook 9 of the spindle body 27, thence back through pulley 25, and finally forward again to the point of beginning at the end of arm 22. The ends of the cable 32 are securely fastened together by standard cable clamps 46, one on each side of arm 22.

As hand lever 23 is pulled backward, the tread of wheel 42, mounted upon spindle 8, is brought below the surface of runner 31, and the runner lifted from the ground. The adjustable spring 30, one end of which is connected to the forward part of runner 31 and the other end to outer fork 2 of the runner spindle body 29, is so adjusted that the runner will keep a horizontal position. When the hand lever 23 is shoved forward as viewed in Fig. 16 the tread of the wheel 42 will rise above the runner 31, and then the runners will be brought into use. The arrangement is similar on both sides of the vehicle, the spindle bodies on both sides operating in unison.

The runners 31 as viewed in Figs. 11 and 12 have broad flat surfaces of suitable metal curved upward at both ends. Along the outer edges of runner 31 are angle irons 53, preferably of steel, running almost the full length of runner 31 and riveted or bolted thereto. Along the inside of runner 31 is a sub-runner 47 extending the length of runner bracket 45. By preventing side slippage where the road is not level, it assists in steering. This sub-runner 47 is bolted to the edge of angle iron 53 in a manner to allow of easy and rapid replacement. The contact edge of sub-runner 47 is a trifle lower than that of the runner 31, and furnishes a good grip upon the snow road. A runner bracket 45 is securely bolted to runner 31 and inner angle iron 53, forming a rigid support for runner 31 and means for pivotal connection with the lower fork 2 of runner spindle body 29.

Figure 13 shows the upward curve in that part of the runner lying behind the wheel opening. This wheel space 52 is large enough to permit different sizes of tire upon wheel 42, without causing interference in the lowered position. A sub-runner 49, riveted to the bottom of runner 31, adds strength and length of life to the runner. The parts of the runner are arranged to give a smooth lower surface. Runner bracket 45 shifts circumferentially on pin 4, mounted in fork 2, and securely fastened by set screw 3.

I claim:

1. Means for supporting the forward end of a motor vehicle consisting of an axle attached to the motor vehicle, runner spindle bodies attached to said axle, runners attached to said runner spindle bodies having apertures therein, spring supporting said runners in horizontal position when carried free from the ground, wheel spindle bodies attached to said runner spindle bodies and rotating upon horizontal shafts projecting from said runner spindle bodies, said wheel spindle bodies having horizontal shafts, wheels mounted upon the shafts of said wheel spindle bodies, cables attached to said wheel spindle bodies, and lever means within the forward end of the motor vehicle controlling said cables.

2. In combination in a motor vehicle, a runner spindle body having a vertical portion, and a wheel spindle body having a hooked portion adapted to fasten upon the vertical portion of said runner spindle.

3. A runner for a motor vehicle having an aperture therein for the entrance of the lower part of a wheel, an angle iron along the outer edge of the runner, a vertically disposed plate attached to the inner edge of said runner, and projecting slightly below it, and a submember attached to the bottom of the runner for additional strength and wear.

In testimony whereof I hereby affix my signature.

FRANK W. SCHROEDER.